US006138346A

United States Patent [19]

Shutts et al.

[11] Patent Number: 6,138,346

[45] Date of Patent: Oct. 31, 2000

[54] PORTABLE HAND-HELD BATTERY-POWERED CRIMPING TOOL

[75] Inventors: Leslie B. Shutts, Ruther Glen; Guenter G. Fietzke, Forest; David L. Kountz, Lynchburg, all of Va.

[73] Assignee: connectool Inc., Ashland, Va.

[21] Appl. No.: 09/216,994

[22] Filed: Dec. 21, 1998

[51] Int. Cl.[7] ........................ B23P 19/00

[52] U.S. Cl. ........................ 29/758; 29/751; 29/753; 29/761; 29/741; 72/429; 72/453.03

[58] Field of Search ........................ 29/758, 751, 741, 29/753, 761; 72/410, 429, 453.03, 48; 173/49

[56] References Cited

U.S. PATENT DOCUMENTS

| | | | |
|---|---|---|---|
| D. 303,917 | 10/1989 | Hatfield . | |
| 3,693,254 | 9/1972 | Salonen | 30/228 |
| 3,709,072 | 1/1973 | Rogers | 81/57.13 |
| 3,926,033 | 12/1975 | Forichon | 72/451 |
| 4,109,504 | 8/1978 | Rommel | 72/407 |
| 4,541,310 | 9/1985 | Lindenberger . | |
| 4,763,733 | 8/1988 | Neumaier | 173/48 |
| 4,899,445 | 2/1990 | Erbrick . | |
| 4,956,992 | 9/1990 | Undin | 72/451 |
| 5,074,142 | 12/1991 | Heskey et al. | 72/410 |
| 5,272,811 | 12/1993 | Armand | 30/228 |
| 5,505,271 | 4/1996 | Bourner . | |
| 5,509,194 | 4/1996 | Hornung et al. | 29/751 |
| 5,558,166 | 9/1996 | Chen . | |
| 5,662,174 | 9/1997 | Vermilyer . | |
| 5,664,634 | 9/1997 | McCracken | 173/48 |
| 5,699,889 | 12/1997 | Gadd . | |
| 5,842,371 | 12/1998 | Liaw | 72/409.12 |
| 5,947,166 | 9/1999 | Doyle et al. | 140/119 |

FOREIGN PATENT DOCUMENTS

| | | | |
|---|---|---|---|
| 902344 | 8/1980 | Germany . | |
| 5-234658 | 9/1993 | Japan | 29/751 |

OTHER PUBLICATIONS

Crimping Tools, Connectool Complete Catalog, 1998, 16 to 41, Connectool, Ashland VA—USA.

Save Same Jungle all the way, The Washington Post, Nov. 26, 1998, D10, Washington, D.C.

Target advertisement.

Battery Operated Crimping Tool CT–2400, http://www.panduit.com/products/solutions/ct–2400.stm.

*Primary Examiner*—Jessica J. Harrison

*Assistant Examiner*—Minh Trinh

*Attorney, Agent, or Firm*—Laubscher & Laubscher

[57] ABSTRACT

A portable hand-held battery-powered crimping tool includes a gear housing containing a through bore receiving a driven gear having a crank arm that is connected by a drive link with the common pivot axis of a toggle device that pivots a pair of crimping jaws from an open released position toward a crimping position. The gear is driven by a reversible direct-current motor that is supported on the hand-held handle together with a battery pack. A releasable overrunning clutch is operated by a push button on the handle to disengage the motor drive from the drive link, whereupon the crimping jaws are pivoted toward the open released position by a biasing spring.

12 Claims, 8 Drawing Sheets

64
64a
64b
64c
66
140
142
A
D
d

PORTABLE HAND-HELD BATTERY-POWERED CRIMPING TOOL

BACKGROUND OF THE INVENTION

1. Field of the Invention

The present invention relates to a portable hand-held battery-powered crimping tool for crimping an electrical connector relative to an electrical conductor or similar device.

2. Brief Description of the Prior Art

It is well known in the prior art to provide crimping tools for crimping an electrical connector to a conductor, and for assembling cable harnesses and the like. One example of such a crimping tool is the CONNECTOOL Series 1300 Crimping Tool with Interchangeable Die Sets, marketed by CONNECTOOL INC. of Ashland, Va., assignee of the instant application. In general, this crimping tool is a manually-operable pliers-like tool having a pair of pivotally connected handles that carry a pair of crimping jaws having removably connected interchangeable pairs of die sets. Another example of such a tool is illustrated in the Erbick, et al., U.S. Pat. No. 4,899,445. Toggle means may be provided to achieve a mechanical advantage for assisting the crimping operation, and releasable ratchet means serve to restrict movement of the operating handles toward the released position.

One drawback to this type of manually operated crimping tool is that the repetitive closure of the mechanical ratcheting hand tools has the likelihood of producing carpal tunnel syndrome to the user. To alleviate this problem, it has been proposed in the prior art to provide power tools having motor means for effecting tool operation, as evidenced, for example, by the prior U. S. Patents to Chen U.S. Pat. No. 5,558,166, and Vermilyer U.S. Pat. No. 5,662,174, among others.

It is also known in the prior art to provide hand-held battery-powered tools, such as drills, as evidenced by the PALADIN Model No. 4338 Electric Drill, marketed by CONNECTOOL INC., and the electric drill marketed by Black & Decker. In this drill, the handle means that carries the drill chuck includes a battery pack and a direct-current variable speed motor for rotating the drill bit chuck. The present invention was developed utilizing these known teachings to provide an improved automatic battery-powered crimping tool that is self-contained, light-weight, safe, and durable.

SUMMARY OF THE INVENTION

The primary object of the present invention is to provide a hand-held crimping tool having motor means for closing a pair of pivotally connected crimping jaws to crimp an electrical connector onto a conductor, cable harness, or the like. The invention is characterized by the provision of first toggle means connected between the jaws and operable to pivotally close the jaws to crimp an electrical connector arranged therebetween, and means including an electric motor and second toggle means for operating the first toggle means to displace the crimping jaws between closed and open positions, respectively.

According to a more specific object of the invention, the means for driving the first toggle means includes a driven gear that is rotatably mounted on the tool housing and that is connected with the first toggle means by a drive link that is part of a second toggle means, thereby to obtain an increased mechanical advantage. The drive link of the second toggle means is connected at its other end with a crank arm defined by an eccentrically arranged crank pin on crank means that are rotatably driven by the driven gear.

Another object of the invention is to provide releasable overrunning clutch means arranged between the second toggle means and the drive motor means. The crimping jaws are normally spring-biased toward the open position, and the clutch means is arranged between the crank means that defines the crank arm and the motor-driven gear. Release push-button means are arranged on the handle for operating the clutch means to disengage the crank means from the driven gear, whereupon the crimping jaws are spring-biased to the open released position.

The crimping tool of the present invention includes an interchangeable die system which uses thumbscrews to retain the die sets in the jaws. This provides the user with the ability to use the tool with any number of die sets for applications including coaxial cable connectors, telephone/data connectors, open barrel terminals, insulated and non-insulated terminal lugs, wire ferrules, and fiber optic connectors.

The crimper comes with a forward/reverse switch located under the jaws, and above the main actuator switch. In forward position, the crimp tool operates normally actuating to full closure of the dies, then popping open when cycle is complete. In reverse mode, the jaws open when the actuator switch is pressed. The reverse is supplied for an emergency release action. There is also a push button on the side of the tool that is an emergency quick release. When pressed, the jaws pop open when the motor is not engaged. This was added in case of battery failure preventing reverse action from working.

The handle housing is an ergonomic handle design which contains contours to fit the palm grip, fingers, and thumb rest. The handle is lined with a soft rubber or foam covering for cushioned gripping.

This tool was developed primarily for manufacturing (cable harness and cable manufacturers) to reduce carpal tunnel syndrome caused by repetitive closure of mechanical ratcheting hand tools.

BRIEF DESCRIPTION OF THE DRAWINGS

Other objects and advantages of the invention will become apparent from a study of the following specification, when viewed in the light of the accompanying drawings, in which.

DETAILED DESCRIPTION OF THE INVENTION

Figure 1:
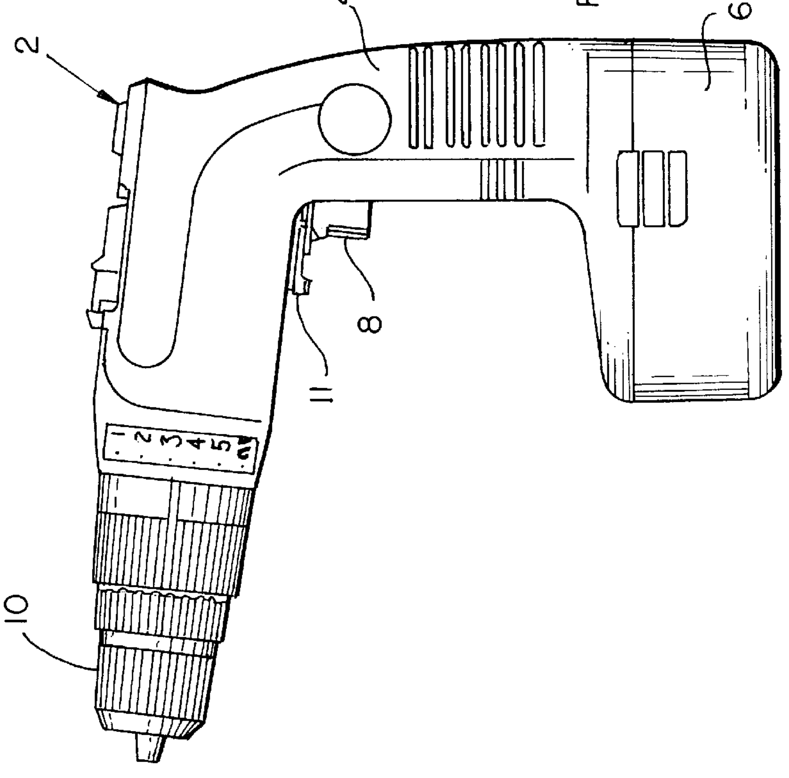
FIG. 1 is a side elevation view of a hand-held battery-powered drill of the prior art.
Figure 8:
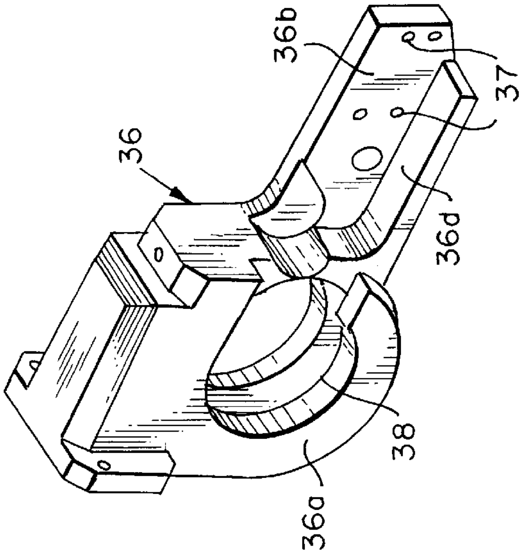
FIGS. 8–12 are front perspective, rear perspective, right side elevation, top, and rear side elevation views, respectively, of the gear housing of FIG. 7.
Figure 9:
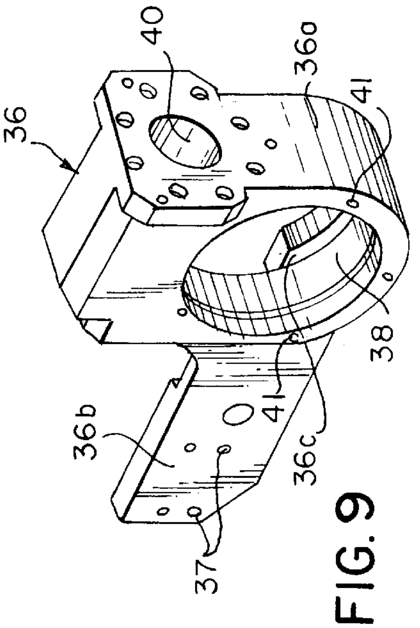

Referring first more particularly to FIG. 1, it is known in the prior art to provide a hand-held battery-operated drill, such as the PALADIN model No. 4338, for example, also sold by CONNECTOOL INC. The drill 2 includes a handle 4 that carries a battery pack 6, the drill being operable by trigger finger means 8 for rotating a chuck 10 that carries the drill bit, not shown. Reversing lever means 11 controls the direction of rotation of chuck 10.

Figure 2:
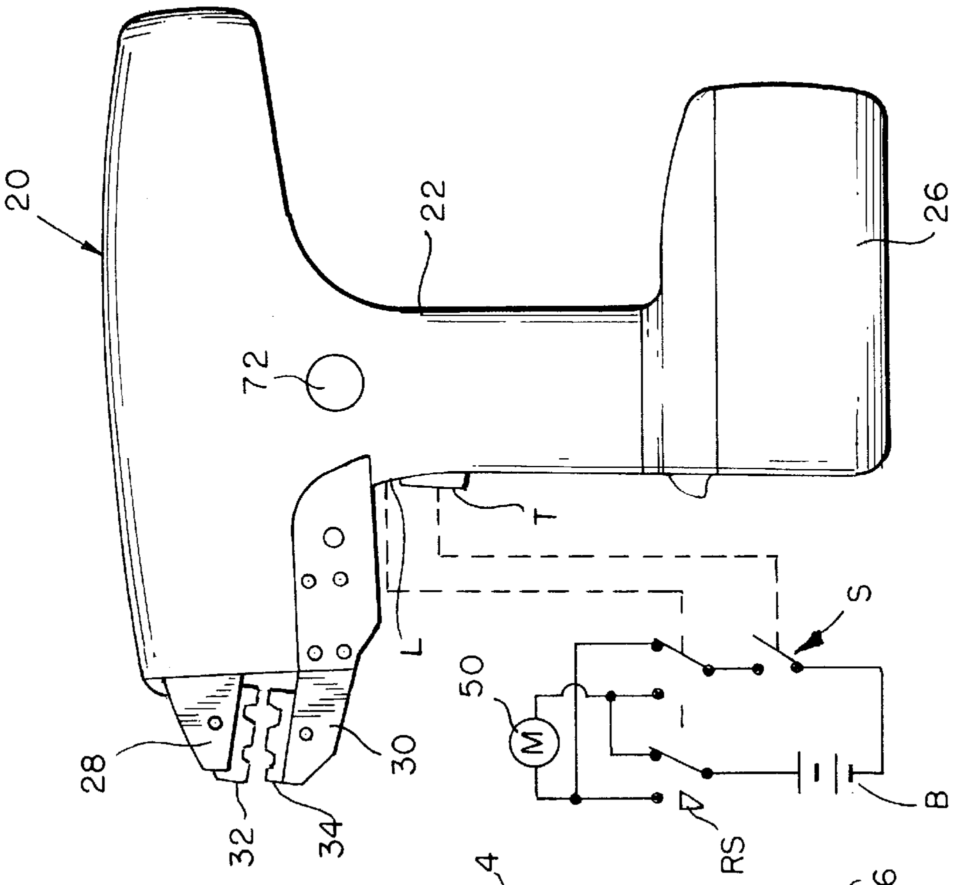
FIG. 2 PRIOR ART
FIG. 2 is a side elevation view of the crimping tool of the present invention.
Figure 3:
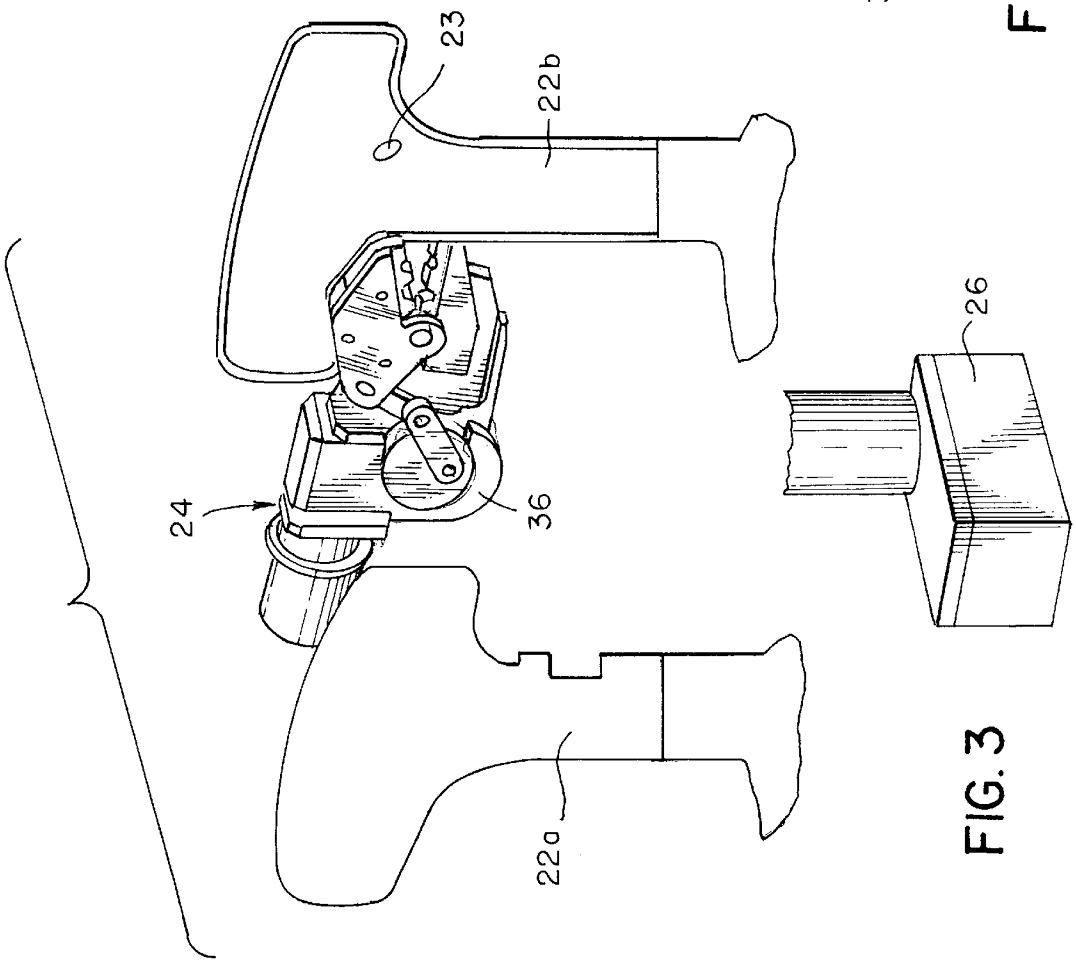
FIG. 3 is a partially exploded front perspective view of the crimping tool of FIG. 2.
Figure 7:
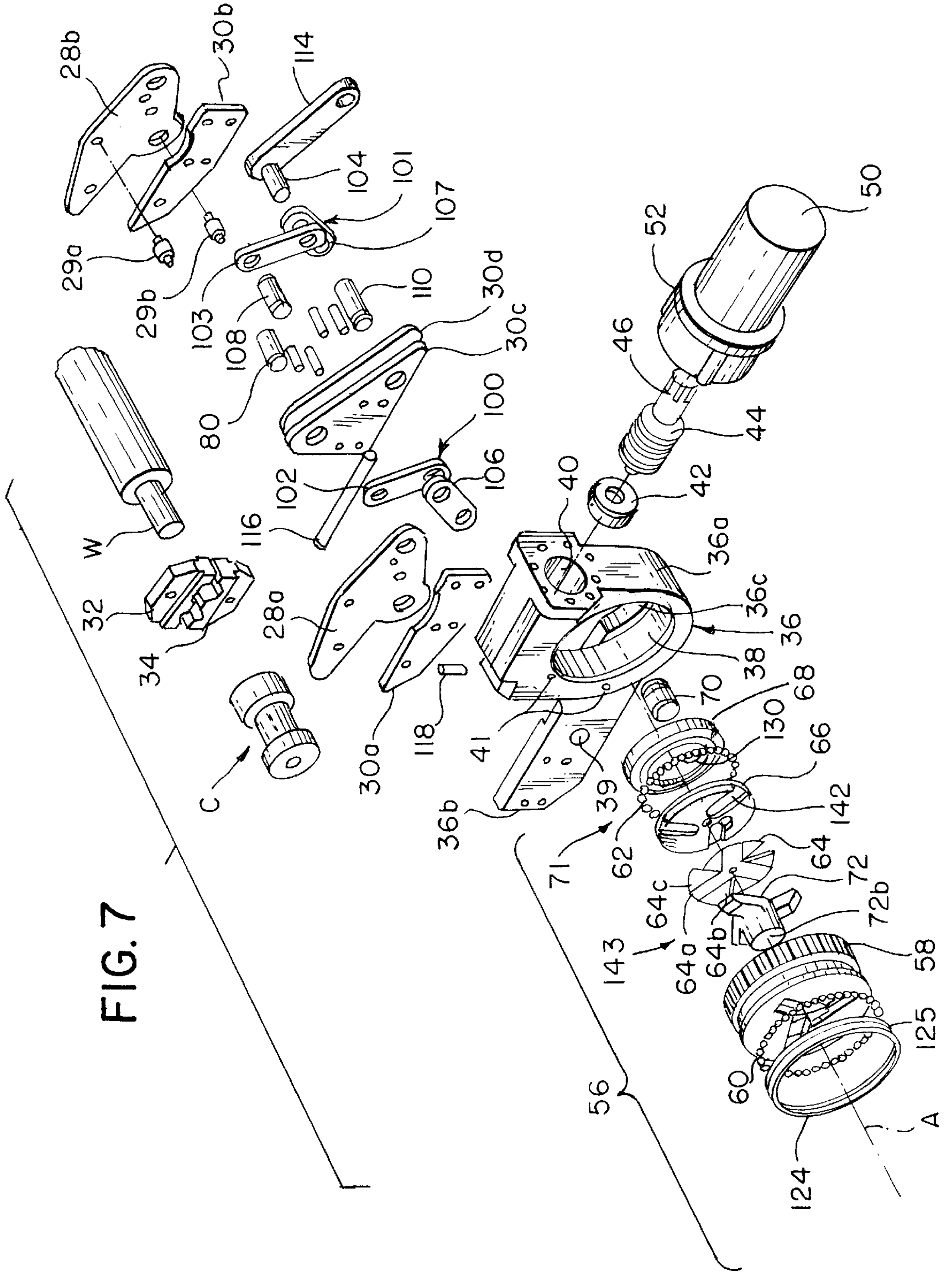
FIG. 7 is an exploded view of the crimping tool of FIG. 6.

Referring now to FIGS. 2 and 3, the hand-held battery-powered crimping tool 20 of the present invention includes a sectional handle 22 including hollow sections 22*a* (FIG. 3) that are connected to contain the connector crimping mechanism 24 of the present invention. A battery pack 26 connected with the bottom of the handle means 22 supplies power for operating the crimping mechanism 24 to displace a pair of pivotally connected crimping jaws 28 and 30 from the illustrated open released position toward a closed crimping position, thereby to crimp an electrical connector C (FIG. 7) upon an electrical conductor W. The handle sections 22*a* and 22*b* are releasably connected together by suitable fastener means, not shown. As is conventional in the art the upper and lower crimping dies 32 and 34 are releasably connected with the jaws 28 and 30 by conventional nuts and bolts or thumbscrews. Trigger-operated switch S controls the energization of the motor 50 from battery B, and reversing switch RS operated by a lever or switch operator L controls the direction of rotation of motor 50.

Referring now to FIGS. 4–9, the crimping mechanism 24 includes a metal worm gear housing 36 having a main housing portion 36*a* containing a counterbored through bore 38. The housing also includes a laterally-extending support portion 36*b* that supports the stationary crimping jaw, as will be described in greater detail below. The main housing portion 36*a* also contains a transverse bore 40 that communicates with the first main bore 38. Seated within the bore 40 are bearing means 42 that support one end of worm 44 having a spline shaft 46 that is driven by a direct-current motor 50 that is bolted to the housing main body portion 36*a*. The motor 50 is operable to drive worm 44 via planetary gear reduction means 52. Mounted for rotation in bore 38 is a worm gear and clutch assembly 56 including driven worm gear 58, ball bearing race means 60 and 62, clutch plate 64, inner and outer crank disks 66 and 68, respectively, crank pin 70, and the manually operated clutch release button 72. The components of the worm gear and clutch assembly have a common axis of rotation A. The operation of the releasable clutch means and worm gear assembly 56 will be described in greater detail below.

Figure 4:
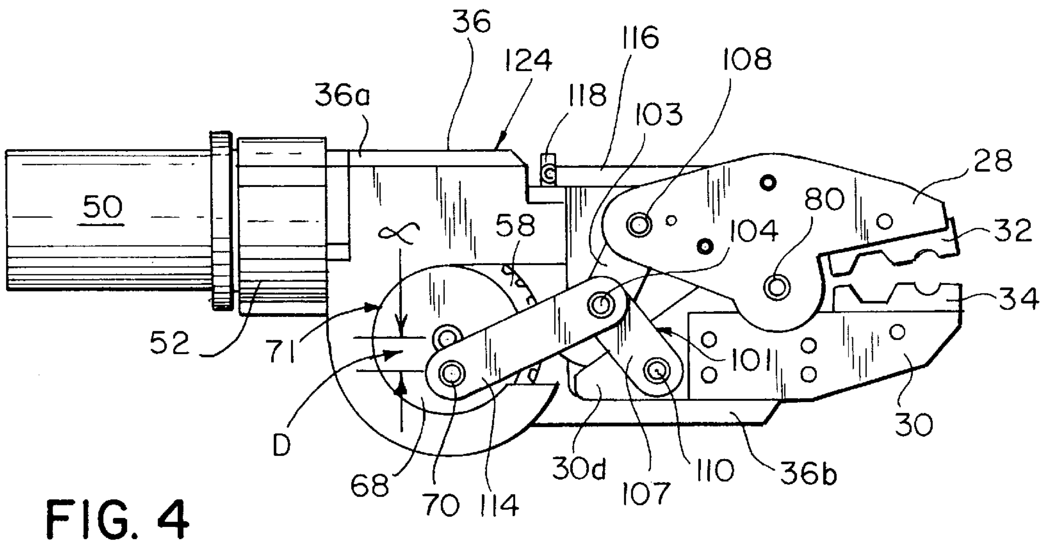
FIGS. 4–6 are left side elevation, top, and right side elevation views, respectively, of the crimping tool mechanism of FIG. 3.
Figure 5:
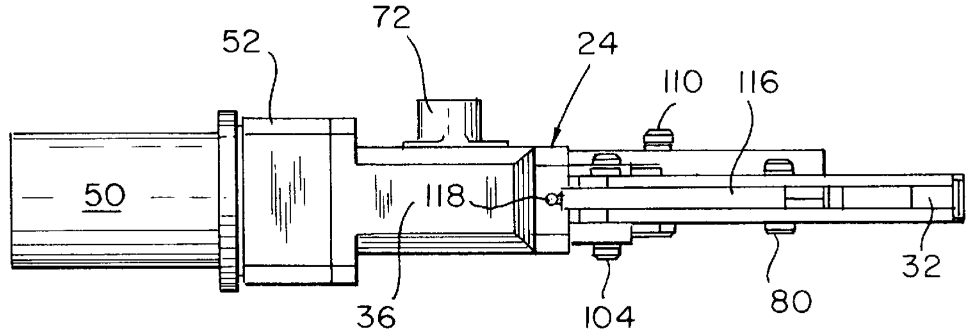

The lower crimping jaw 30 is a stationary jaw that is rigidly fastened (by rivets, for example) with the support portion 36*b* of the housing body 36. The upper crimping jaw 28 is pivotly connected intermediate its ends by pivot pin 80 with the lower jaw 30. The upper jaw includes a pair of parallel jaw plates 28*a*, 28*b* spaced by the spacer pins 29*a* and 29*b*, and the lower jaw 30 includes an assembly of a pair of lower plates 30*a* and 30*b* arranged on opposite sides of a pair of center plates 30*c* and 30*d*. A pair of first toggle means 100 and 101 are provided on opposite sides of the center plates 30*c* and 30*d* of the stationary jaw means 30. The toggle means include upper first links 102 and 103 that are pivotally connected at one end by toggle pivot shaft 104 with lower toggle links 106 and 107. The upper ends of the toggle links 102 and 103 are connected by pivot pin 108 with the adjacent end of the upper crimping jaw 28, and the other end of the lower toggle links 106 and 107 are connected by pin 110 with the center plates 30*c* and 30*d* of the stationary crimping jaw means 30, and the opening 37 in the housing support portion 36*b*. The drive link 114 carries pivot pin 104 at its one end, and at its other end the drive link is pivotally connected with crank arm pin 70 on cam plate 68, as best shown in FIG. 4. Tension spring 116 is connected between pin 118 on the worm gear housing and the upper crimping jaw 28, thereby to bias the crimping jaws toward their open released position of FIGS. 4 and 6.

Figure 13:
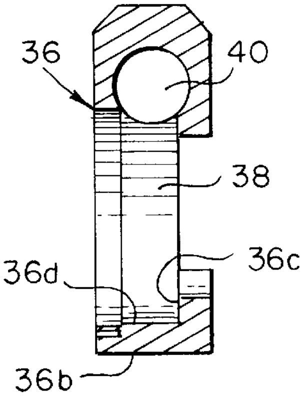
FIG. 13 is a sectional view taken along line 13—13 of FIG. 10.
Figure 14:
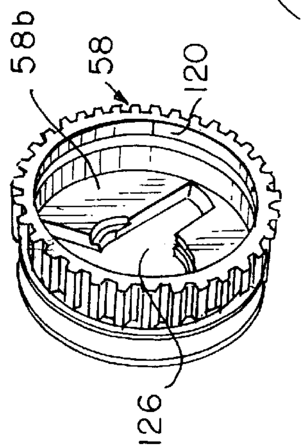
FIGS. 14–16 are rear perspective, front and rear views, respectively, of the worm gear of FIG. 7.
Figure 15:
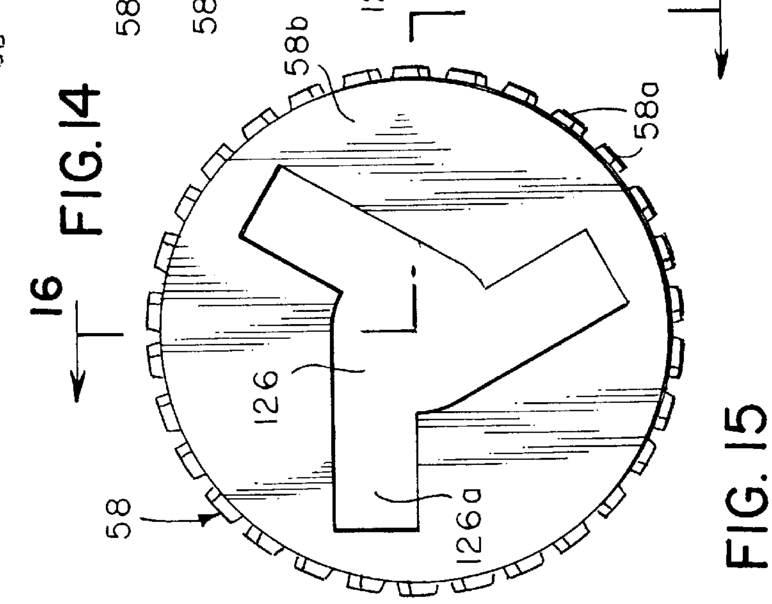
Figure 16:
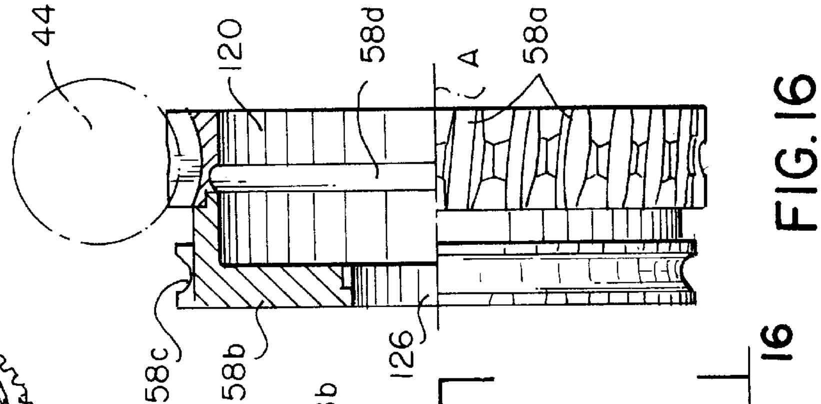
Figure 17:
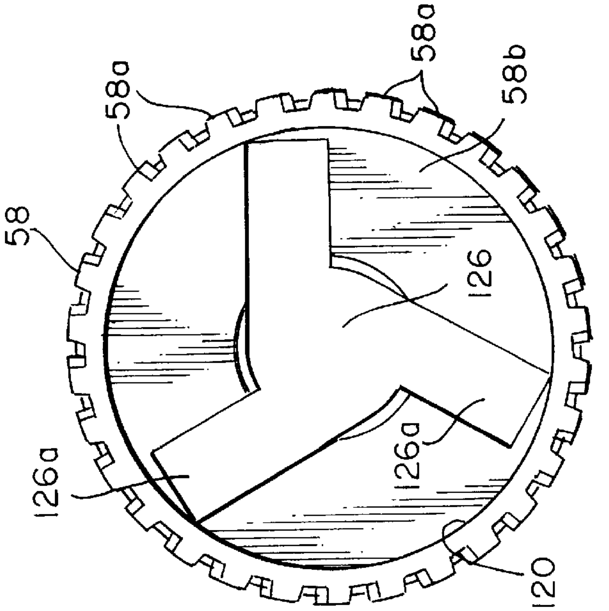
FIG. 17 is a sectional view taken along line 17—17 if FIG. 15.

Referring now to FIGS. 8–13, the through bore 38 in housing 36 is counter bored to define a support shoulder 36*c* which serves as a stop shoulder for maintaining together the components of the worm gear and clutch assembly 56. The laterally extending support portion 36*b* is also provided with a horizontal support ledge 36*d* that supports the end plates 30*a* and 30*b* and the center plates 30*c* and 30*d* of the stationary jaw means 30, the plates being riveted to the housing 36 by rivets (not shown) that extend through rivet holes 37. The support portion 36*b* contains also a through bore 39 for receiving the toggle pivot pin 110. As best shown in FIG. 13, transverse bore 40 contained in the upper end of housing 36 is in communication with through bore 38.

As shown in FIGS. 14–17, the driven worm gear 58 includes on its outer periphery worm threads 58*a* that are in meshing engagement with the driving worm 44 that is driven by the electric motor 50 via reduction gearing means 52. The driven worm gear 58 contains a counter bore 120 that defines an end wall portion 58*b* which contains a central opening 126 having three generally radially outwardly extending arm portions 126*a*.

The worm gear 58 is provided on its outer periphery with a first bearing groove 58*c* for receiving the first ball bearing race means 60 that rotatably support the worm gear within housing bore 38, and on its inner periphery with a second bearing groove 58*d* that receives the second ball bearing race means 62 that rotatable supports the crank means 91 within the worm gear 58, as will be described below. Outer bearing rings 124 and 125 (FIG. 7) maintain the bearing race means 60 in the groove 58*c*, and the inner and outer crank means 66 and 68 maintain the ball bearing race means 62 in the groove 58*d* when the cam plates are introduced within the counterbore 120 contained in the worm gear 58.

Referring to FIGS. 18–21, the release button 72 is formed from a synthetic plastic material such as Delrin and includes a body portion 72*a* having at one end three radially outwardly extending arms 72*b* that are received in the corresponding arm portions 126*a* of opening 126 contained in the end wall 58*b* of the driven worm gear 58. The free end 72*c* of the body portion 72*a* of the release button 72 extends through the central portion of opening 126 of the worm gear 58.

Figure 23:
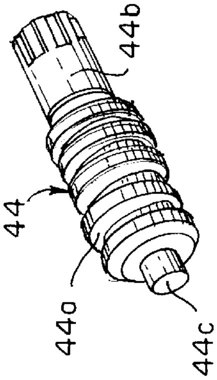
FIGS. 22 and 23 are side elevation and front perspective views, respectively, of the worm and spline means of FIG. 7.
Figure 22:
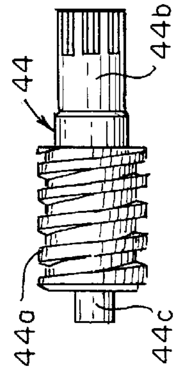
Figure 21:
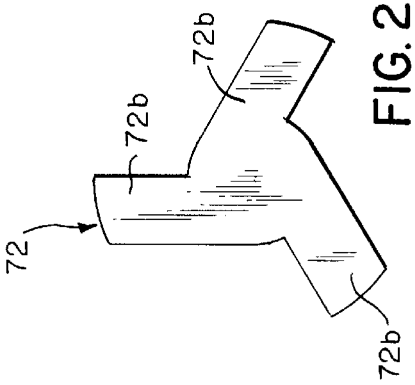
FIGS. 18–21 are front perspective, front, right elevation and rear views, respectively, of the release button of FIG. 7.
Figure 20:
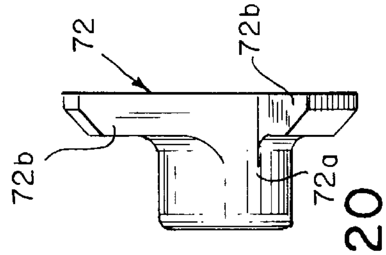
Figure 18:
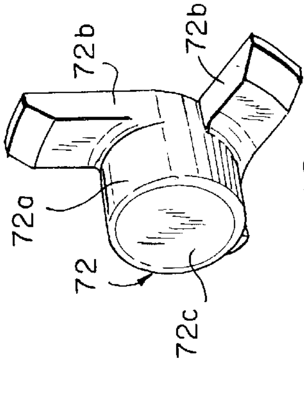
Figure 19:
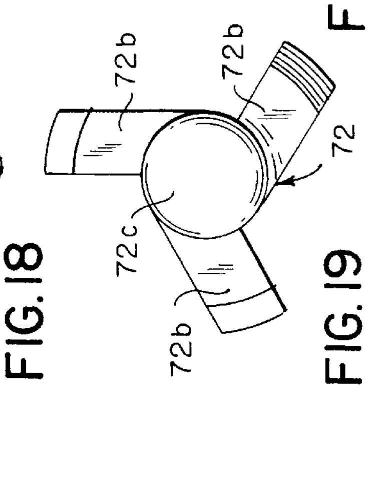

As illustrated in FIGS. 22 and 23, the worm assembly 44 includes an external helical thread 44*a,* an axial spline 44*b* that is driven by the output of the reduction gear means 52, and an end shaft 44*c*. Thus, when the motor 50 and reduction gear means 52 are bolted to the associated end of the housing 36, the worm gear 44 is introduced into the transverse bore 40 for enmeshing engagement with the ring gear 58, the end shaft 44*c* of the worm 44 being supported by the bearing means 42 mounted in the end portion 40*a* of the transverse bore 40.

Figure 24:
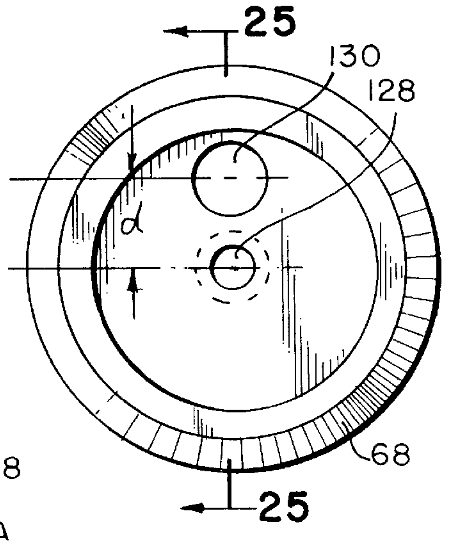
FIG. 24 is a front view of the outer crank arm disk of FIG. 7.
Figure 10:
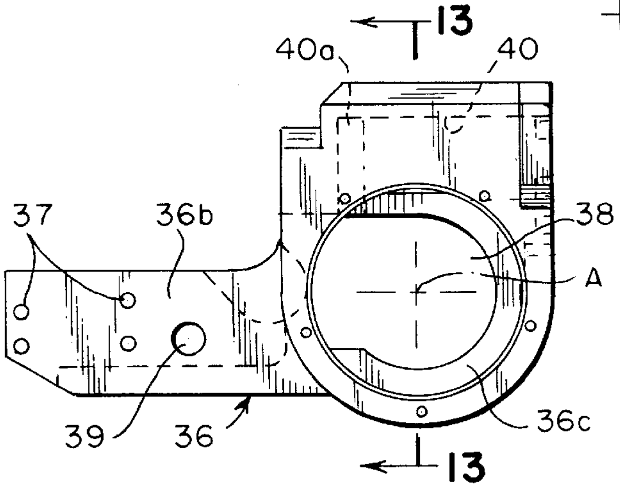
Figure 25:
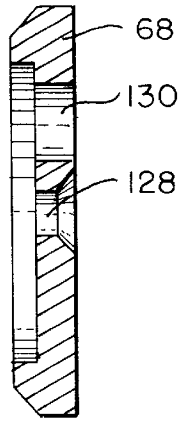
FIG. 25 is a sectional view taken along line 25—25 of FIG. 24.
Figure 11:
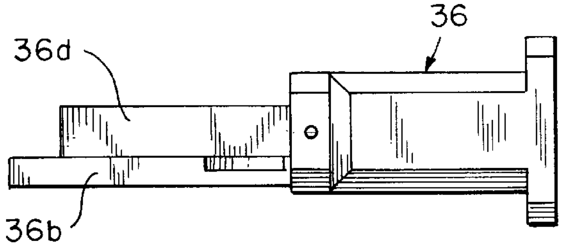
Figure 12:
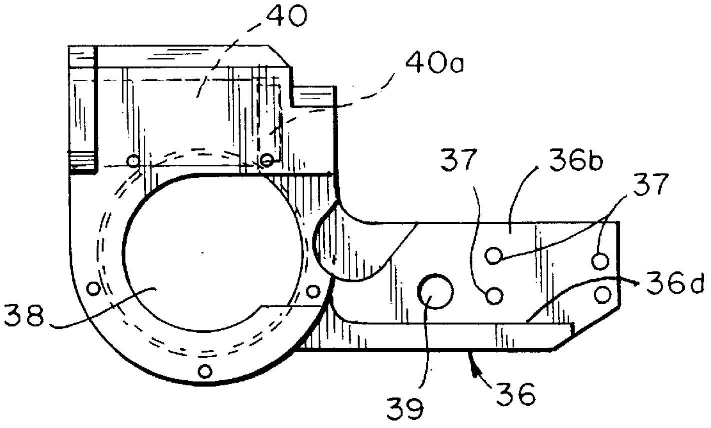

As shown in FIGS. 24 and 25, the outer crank disk 68 contains a center through bore 128, and an eccentrically-arranged crank pin bore 130 that receives the crank pin 70 of drive link 114. As will be explained in greater detail below, the center of the crank pin bore 130 is spaced from the center 120 by a crank arm D having a length d, as shown in FIGS. 4 and 24.

Figures 26, 27, 28, 29, 30, 31, 32:
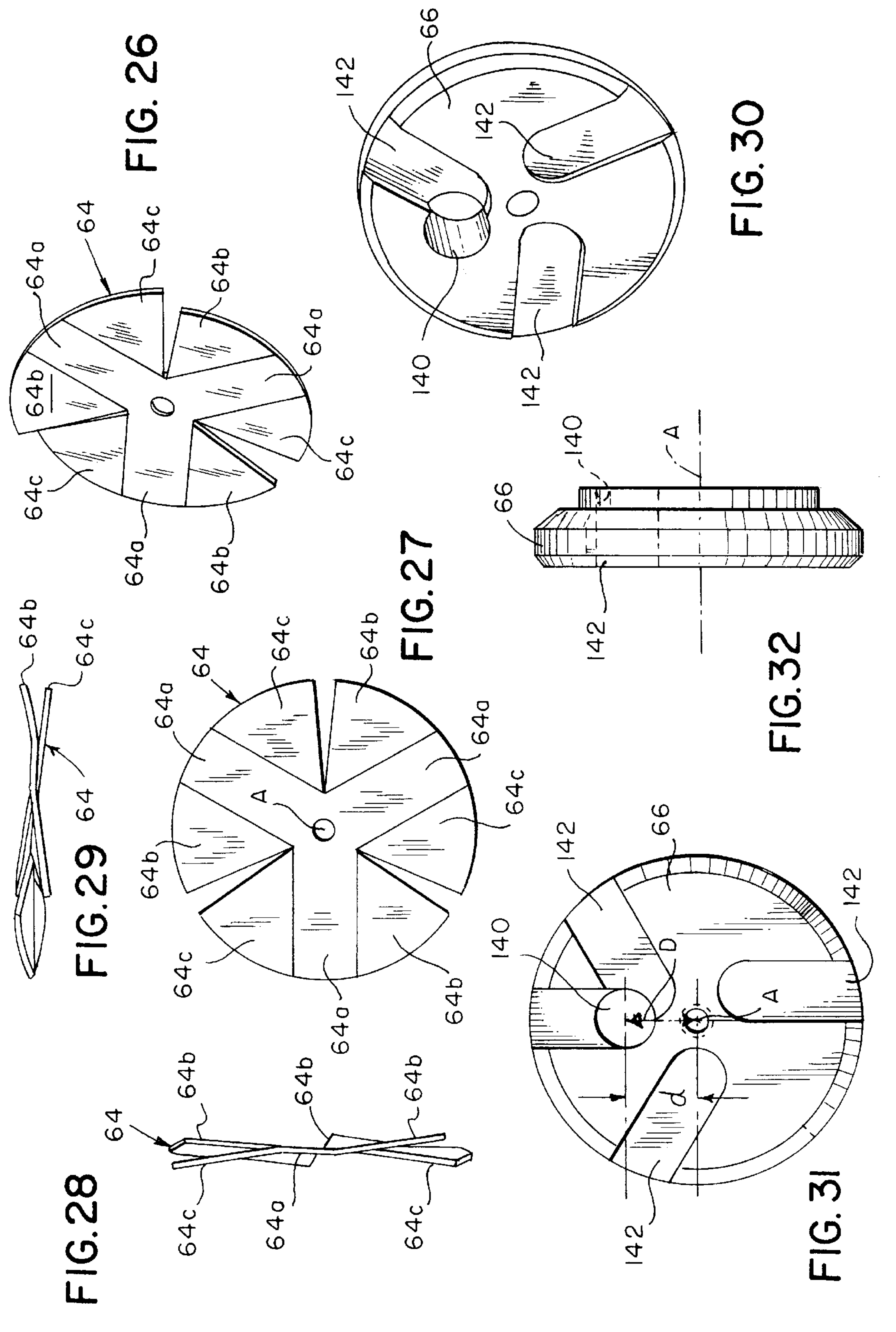
FIGS. 26–29 are front perspective, front elevation, left side and top views, respectively, of the clutch plate of FIG. 7; and, FIGS. 30–32 are front perspective, front elevation, and right side views, respectively, of the inner crank arm disk of FIG. 7.

Referring now to FIGS. 26–29, the clutch plate 64 is formed of a resilient material such as spring steel or suitable synthetic plastic material and includes three radially arranged arms 64*a* that are provided on each side with oppositely angularly bent wing portions 64*b* and 64*c,* respectively. As shown in FIGS. 28 and 29, the wing portion 64*b* are bent to one side of the plane containing the arm 64*a,* and the wing portion 64*c* are bent to the other side of this plane.

Figure 6:
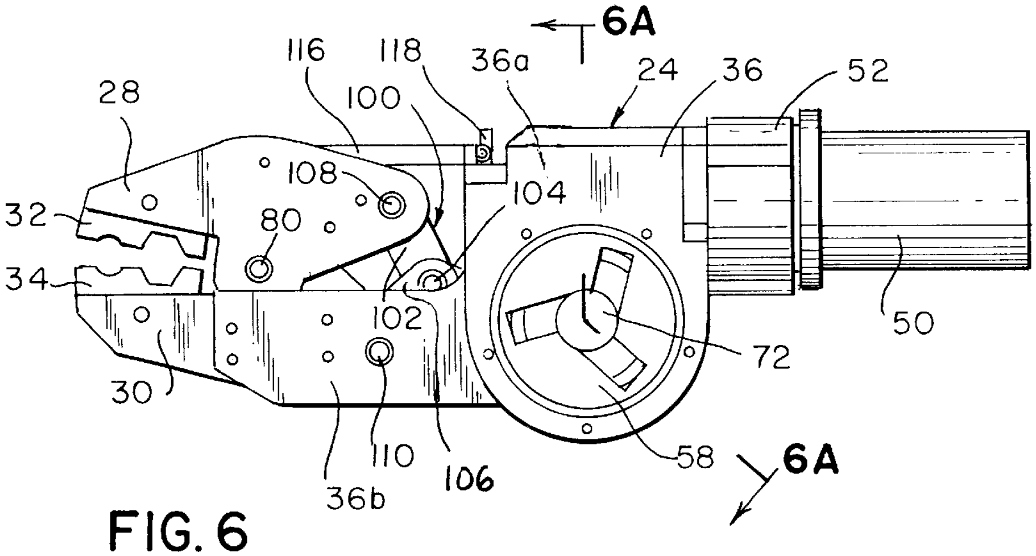
Figure 6A:
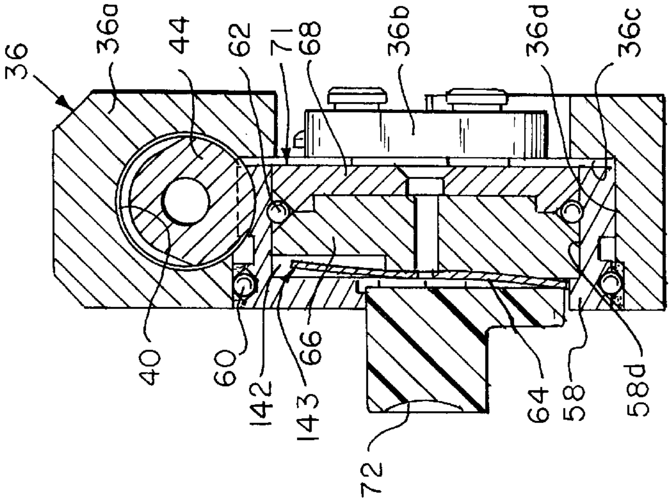
FIG. 6A is a sectional view taken along line 6A—6A of FIG. 6.

Finally, as shown in FIGS. 30–32, the inner crank disk 66 contains a crank pin through bore 140 that is offset from the center axis of the inner crank disk by a distance corresponding to the length d of crank arm D, the bore 140 being opposite the crank pin bore 130 in outer crank disk 68, whereby the crank pin 70 extends collinearly through both bores. Thus, the inner and outer crank disks 66 and 68 are connected by crank pin 70 to define crank means 71 (FIG. 6A) upon which is concentrically mounted the bearing race 62. The face of the inner crank disk 66 adjacent the clutch plate 64 contains radial clutch grooves 142 for receiving the wing portions 64*c* of the clutch plate 64, thereby to define overrunning clutch means 143 (FIG. 6A).

Operation

Assume that the crimping mechanism of the present invention is mounted within the carrying handle means 22 as shown in FIG. 2, and that the motor 50 is a direct-current motor driven by a 14.4 volt nickel cadmium battery pack 26 via trigger-operated on-off switch S and lever or trigger-operated reversing switch RS. The handle section 22*b* is fastened to the gear housing 36 of the crimping mechanism by screw fasteners or the like that extend into threaded holes 41 provided on the adjacent face of the housing 36, the end portion 72*b* of the release push button extending through the corresponding opening 23 (FIG. 3) contained in handle section 22*b*. As shown in FIG. 6A, the worm gear and clutch assembly is maintained within the bore 38 of housing 36 with the outer cam member 68 in abutting engagement with the counterbore stop shoulder 36*c*. The bent wings 64*c* of clutch plate 64 extend within the corresponding radial grooves 142 contained in the adjacent face of inner cam member 66. The handle section 22*a* is then fastened to handle section 22*b* to complete the assembly. The crimping jaws 28 and 30 are biased apart to the normal open or released position of FIGS. 4 and 6 by the biasing spring 116.

To operate the crimping mechanism to fasten a connector C to a wire W (FIG. 7), the trigger T is operated to close on-off switch S (FIG. 2) to activate the direct current motor 50, whereupon worm gear 58 is rotatably driven by motor 50 via reduction gear means 52 and worm 44. The inner and outer clutch disks 66 and 68 are rotatably driven by the worn gear 58 via the clutch plate 64, the oppositely extending wing portions 66*b* and 66*c* thereof being in engagement with the corresponding edges of the slots 122 contained in the worm gear and the grooves 142 grooves contained in the adjacent face of the inner crank member 66, respectively. Assuming that crank plate 68 is driven in the counter clockwise direction in FIG. 4, crank pin 70 is eccentrically driven about the axis of rotation of the crank means 71 toward the pivot axis 80, whereupon drive link 114 is displaced to the right to shift toggle pin 104 to the right to extend the toggle linkage 100 and 101 and thereby pivot the upper crimping jaw 28 about pivot pin 80 against the biasing force of spring 116 toward the closed crimping position relative to lower jaw 30. The die members 32 and 34 are brought into engagement with the connector C to initiate crimping thereof onto conductor W. According to an important advantage of the invention, as the toggle links 102, 106 and 103, 107 of toggles 100 and 101 are progressively pivotally displaced toward a relatively linear orientation, respectively, a first toggle mechanical advantage is provided for crimping the connector C to the conductor W, and as the crank arm D on the crank means 71 and the drive link 114 also progressively approach a linear orientation, a second crimping mechanical advantage is achieved. Therefore, two toggle mechanical advantages are achieved for crimping the connector C upon the conductor W.

The "reversing switch" offers an option to the operator to reverse the motion of the crimping jaws at any moment—for whatever reason. During normal operation of this tool, however, the reversing switch is never used. The operator depresses the trigger until the crimping jaws/toggle mechanisms are driven past their "dead center," and a maximum crimping force has been achieved. Now, collapsing past "dead center," the mechanism becomes powered by the biasing spring, causing it to rotate faster than the motor driven inner crank member 66. Driven by the biasing spring, the mechanism disengages the wings of the clutch plate and "overruns" the position of the clutch grooves 142 in inner crank member 66, which used to drive it. With the crimping jaws open, the clutch plate finally assumes its "home position" close to a location that is approximately 180 degrees opposite to "toggle dead center." The operator, after noticing that the crimping jaws have popped open, releases the trigger at his own timing. The cycle is complete.

Depressing the trigger again causes the clutch grooves 142 to rotate, find the wings of the clutch plate at their home position, engage them again, and start a new cycle.

The operator is never required to "closely" monitor the "fully crimped" and "fully open" positions of the tool—and time them with his trigger. The tool is always "popped" open during a window of 120 degrees of rotation of the motor driven inner crank member 66.

In the event that an emergency release condition should be desired when the jaws are in the closed crimping condition, release button 72 is pushed inwardly into the housing to apply axial force to the clutch plate 64, thereby to partially straighten the resiliently bent wing portions and cause bent wings 64*c* to be disengaged from clutch grooves 142, whereupon the movable crimping jaw 28 is pivoted toward the open position by return spring 116.

The crimping tool is driven by a 14.4 volt direct-current motor 50 that runs at 20,000 rpm, and the reduction gear means 52 is preferably a double planetary reduction gear which drives the worm gear 58. The 28.5:1 reduction ratio of the planetary gear set, in addition to the 30:1 reduction ratio of the worm gear yields an overall reduction ratio of 857:1. The worm gear runs at 23 rpm max for a crimp cycle time of 2.6 seconds mininum. This cycle time includes the time for the jaws to open again after the crimp is done.

While in accordance with the provisions of the Patent Statutes the preferred forms and embodiments of the invention have been illustrated and described, it will be apparent to those skilled in the art that changes and modifications may be made without deviating from the inventive concepts set forth above.

What is claimed is:

1. A crimping tool for crimping an electrical connector onto an electrical conductor, comprising:

(a) a gear housing (36);

(b) a pair of crimping jaws (28, 30) a first one (30) of which is stationary and is connected with said housing;

(c) first pivot means (80) connecting the other (28) of said crimping jaws for pivotal movement between released and crimping positions relative to said first crimping jaw;

(d) spring means (116) biasing said second crimping jaw toward said released position relative to said first crimping jaw; and (e) drive means for pivoting said second crimping jaw from said released position toward said crimping position relative to said first crimping jaw, said drive means including:

(1) first toggle means (100, 101) connected between said pair of crimping jaws, said toggle means including a first pair of first toggle links pivotally connected together at one end by second pivot means (104);

(2) second toggle means including means defining a crank arm (D), and a toggle link (107) pivotally connected at one end with one end of said crank arm by third pivot means (70), said second toggle link being pivotally connected at its other end with said second pivot pin, said first, second, and third pivot means being parallel;

(3) an electric motor (M) connected with said housing, said motor having a rotary output shaft; and (4) overrunning clutch means (143) normally having an engaged condition connecting said motor shaft with said crank arm means, said overrunning clutch means being automatically operable to a disengaged condition at the end of a crimping cycle following the displacement of said second crimping jaw from said released position toward said crimping position, whereupon said second crimping jaw is displaced by said spring means toward said released position.

2. The crimping tool as defined in claim 1, wherein said gear housing contains a first bore (38) having a longitudinal axis parallel with said first pivot pin; and further wherein said drive means includes driven gear means (58) rotatably mounted coaxially within said bore.

3. The crimping tool as defined in claim 2, wherein said crimping jaws are pivotally connected intermediate their ends by said first pivot means (80); wherein said first toggle means are connected between corresponding first ends of said crimping jaws; and further including a pair of crimping dies (32, 34) removably connected with the other ends of said crimping jaws, respectively.

4. The crimping tool as defined in claim 3, wherein said driven gear means (58) includes a driven worm gear (58); wherein said housing contains a transverse second bore (40) in communication with said first bore; and further wherein said drive means includes a driving worm gear (44) rotatably mounted in said second bore in enmeshing engagement with said driven gear.

5. The crimping tool as defined in claim 4, wherein said drive means further includes reduction gearing means connected between said motor and said driven worm.

6. The crimping tool as defined in claim 5, wherein said motor (50) is a reversible direct-current motor; and further wherein said drive means includes a battery (B), and 5 means including an on-off switch (S) connecting said motor with said battery.

7. The crimping tool as defined in claim 5, and further including a reversing switch (RS) for reversing the direction of rotation of said motor.

8. The crimping tool as defined in claim 6, and further including handle means (22) for manually transporting said gear housing, said battery, and said on-off switch, said reversing switch being mounted on said handle means.

9. The crimping tool as defined in claim 4, wherein said driven gear means contains a counterbore **(58*d*); and further wherein said crank arm means includes crank disk means (71) rotatably mounted concentrically within said counterbore, said overrunning clutch means including a clutch disk (64)** arranged coaxially within said counterbore between the bottom wall thereof and said crank disk means.

10. The crimping tool as defined in claim 9, wherein said clutch disk (64) is formed of a resilient material and includes a plurality or radially outwardly extending bent wing portions **(64*c*) that normally extend within corresponding radially outwardly extending clutch grooves (142) contained in the adjacent face of said crank disk means (71)**.

11. The crimping tool as defined in claim 10, and further including push-button release means (72) operable to apply an axial force to said clutch disk and thereby deform the same to cause said wing portions to be bent out of engagement with said radial grooves, thereby to release said clutch disk from said crank disk means.

12. The crimping tool as defined in claim 11, wherein said push-button release means includes a push button that extends at one end through corresponding aligned openings contained in said worm gear and in said handle means.

* * * * *